United States Patent [19]

Takai et al.

[11] Patent Number: 4,690,327
[45] Date of Patent: Sep. 1, 1987

[54] HOT GUNNING ROBOT FOR FURNACE LINING

[75] Inventors: Kiyoshi Takai, Nishinomiya; Akinori Kaseya, Ashiya, both of Japan

[73] Assignee: Godo Steel, Ltd., Osaka, Japan

[21] Appl. No.: 824,835

[22] Filed: Jan. 31, 1986

[51] Int. Cl.⁴ .............................................. B05B 3/02
[52] U.S. Cl. .................................... 239/226; 239/227; 239/587
[58] Field of Search ........... 239/227, 587, 265, 265.35, 239/226; 414/917; 901/15; 118/317, 323

[56] References Cited

U.S. PATENT DOCUMENTS

| | | | |
|---|---|---|---|
| 535,478 | 3/1895 | Baker | 239/587 |
| 2,078,566 | 4/1937 | Fletcher | 239/227 |
| 3,599,871 | 8/1971 | Ruppel et al. | 239/227 |
| 4,163,546 | 8/1979 | Morris et al. | 239/227 X |
| 4,211,367 | 7/1980 | Allison | 239/226 |
| 4,221,953 | 9/1980 | Kiilunen | 901/15 X |

FOREIGN PATENT DOCUMENTS 11559  1/1977  Japan ................. 414/917

*Primary Examiner*—Andres Kashnikow
*Assistant Examiner*—Daniel R. Edelbrack
*Attorney, Agent, or Firm*—Lowe Price LeBlanc Becker & Shur

[57] ABSTRACT

A hot gunning robot system moves a gunning nozzle along a vertical center line of the furnace and changes the swiveling angle of the gunning nozzle to perform mending of all interior side and bottom surfaces of the furnace. The system comprises a shifter transferring the nozzle carrier from a housing position to a mending position in the furnace. The shifter has parallelogram-links and an actuator which actuates the links to move the nozzle carrier in an upright constant orientation. A water feeding tube is fitted on a vertical feeding pipe to mix lining material powder with water to obtain a sludgy lining material introduced into the gunning nozzle smoothly by guide vanes provided in a cylindrical nozzle supporter. The nozzle carrier is partitioned into a driving chamber and an air chamber and both of chambers are air cooled. A driving system and bearing system for the vertical feeding pipe is protected from the heat of the furnace. Swinging of the vertical feeding pipe is prevented by a stabilizer to provide centering support therefor.

9 Claims, 18 Drawing Figures

HOT GUNNING ROBOT FOR FURNACE LINING

TECHNICAL FIELD

The present invention relates to a hot gunning robot which mends an eroded furnace lining continuously and automatically by spouting sludgy lining material while its gunning nozzle is traveling vertically along the center line of an electric furnace.

BACKGROUND OF THE INVENTION

Refining of the charged scrap in an electric furnace is performed by arcs generated from electrodes. A lining on a wall or a bottom of a furnace is eroded by high temperature molten steel and slag during the melting process. The worn lining is mended by spouting sludgy lining material under the high temperature condition immediately after the tapping. In order to spout lining material an operator must insert a gunning nozzle attached to a long lance through a side opening of a furnace. Here, hard labor in a very severe operating condition with a high temperature is forced upon the operator. Moreover, it is not easy to mend the wide range of the lining and much more skillful technique is required.

A hot gunning machine 80 as shown in FIG. 17 has been used in order to release an operator from the direct operation of the long lance which is hard to handle. The hot gunning machine 80 comprises a main pole 81 disposed by an electric furnace 3, a shifting arm 82 which travels vertically along the main pole 81 and rotates around the main pole 81 and a nozzle carrier 83 which is equipped on the shifting arm 82. An exchangeable gunning nozzle 84 is attached to the lower end of the nozzle carrier 83 and the nozzle carrier 83 travels vertically along the center line of the furnace. Therefore, the gunning nozzle 84 can be transferred from the housing position shown by single-dot chain lines to the advanced position above the furnace shown by solid lines and then to the gunning position shown by double-dot chain lines. After the gunning nozzle 84 is revolved toward the required direction as shown by an arrow 85, lining material from a pneumatic transport hose 86 is spouted to mend the worn lining 3a. To mend the lining on the bottom of the furnace, the gunning nozzle 84 is retreated to the housing position and is exchanged for a gunning nozzle which has an angle suitable for gunning toward the bottom of the furnace.

The hot gunning machine described above facilitates machanical and remote operation under the high temperature condition and reduces the burden of the operator. Moreover, as the nozzle carrier can travel along the vertical center line of the furnace in an upright posture, when uniform mending over the inside of the furnace is required, it can be carried out easily by revolving the gunning nozzle 84.

However, there are difficulties as follows:

(1) When an electric furnace is large, the shifting arm 82 has to be long. In order to make the shifting arm 82 rotate in the circumference of the furnace, a large space must be maintained in a building where the electric furnace is installed.

(2) The machine is bulky in the housing position and occupies wide area so that the installation of other incidental equipments becomes restrictive.

(3) The gunning nozzle has to be exchanged in accordance with the portion to be mended. Therefore, a lot of manpower and time for the exchanging nozzle are necessary.

In order to solve the problem of the exchange for the gunning nozzle, for instance a swivel joint can be applied. As shown in FIG. 18, a known swivel joint 87 is attached to the lower end of the nozzle carrier 83 to facilitate tilting of the gunning nozzle 84. The swivel joint 87 has a swivel axis 88 and a horizontal path 90 is formed in a swivel shaft 89. The sludgy lining material passes through from a vertical path 91 to the horizontal path 90 and to a tilted path 92. however, as the lining material has to pass through two sharp bending parts, pressure loss becomes large and walls of the paths are heavily worn by the lining material. Moreover, the sludgy lining material stagnates at the bending parts and choking causes.

DISCLOSURE OF THE INVENTION

The first object of the present invention is to facilitate:

housing a hot gunning machine compactly near by an electric furnace;

making a gunning nozzle travel vertically along a center line of an electric furnace and revolve around the vertical center line;

changing the angle of the tilt of the gunning nozzle when lining material is spouted by remote control; and as a result, mending the lining under the hot condition quickly, continuously and automatically.

The second object of the present invention is to facilitate relieving choking of the sludgy lining material in the gunning nozzle and wearing wall of the pathes.

The third object of the present invention is to facilitate:

obtaining homogeneous sludgy lining material by mixing water with lining material uniformly;

protecting vertical feeding pipe for lining material from the heat of a furnace;

avoiding choking by removing sludgy lining material remaining in the gunning nozzle.

The fourth object of the present invention is avoiding the swing of the gunning nozzle and the vertical feeding pipe and stabilizing a whole operating machine and hence facilitating accurate mending of the lining of the predetermined portions.

The fifth object of the present invention is preventing heat of the furnace from influencing directly the driving system and the bearing system of the vertical feeding pipe.

BRIEF DESCRIPTION OF THE DRAWINGS

These and other related objects of this invention are achieved by providing a shifting arm to which a nozzle carrier is attached; parallelogram-links which move said shifting arm in a constant posture; a vertical feeding pipe which rotates in said nozzle carrier and which feeds lining material; a cylindrical nozzle supporter with an inlet port connected with the lower end of said vertical feeding pipe; and has a gunning nozzle which can be tilted and has a nozzle base fitted on said cylindrical nozzle supporter.

BEST MODE FOR PRACTICING THE INVENTION

Figure 1:
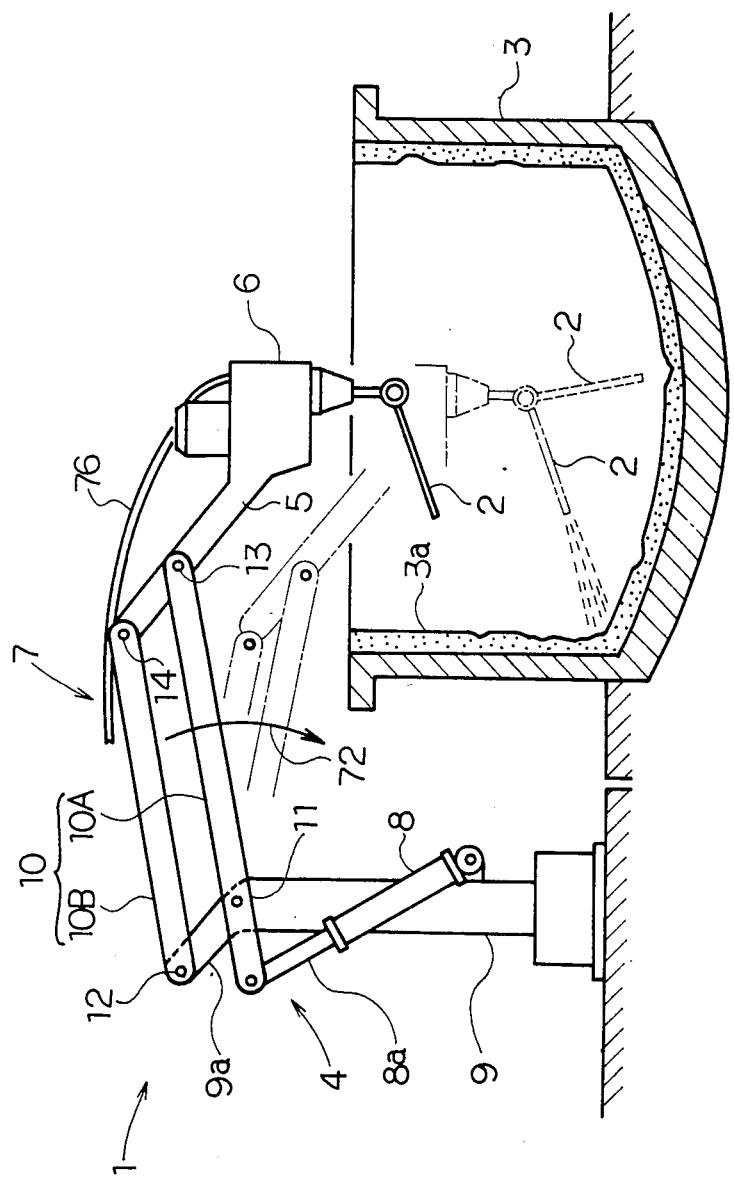
FIG. 1 is a schematic illustration showing a hot gunning robot of the present invention installed near by an electric furnace.

A hot gunning robot 1 shown in FIG. 1 briefly comprises:

a gunning nozzle 2 which spouts lining material toward a furnace lining;

a shifter 4 which makes the gunning nozzle 2 advance into and retreat from an electric furnace 3; and a nozzle carrier 6 attached to the shifting arm 5 which is a part of the shifter 4.

The shifter 4 transfers the gunning nozzle 2 from a housing position to a mending position and consists of parallelogram-links 7 and an actuater 8 which operates the parallelogram-links 7. The base of the hydraulic cylinder 8 is attached to a main pole 9 installed near by the electric furnace 3. The parallelogram-links 7 consists of two links 10A and 10B, a bending part 9a formed at the tip of the main pole 9 and the shifting arm 5. The links 10A and 10B are supported on fulcra 11 and 12 provided at both ends of the bending part 9a and fulcra 13 and 14 provided on the shifting arm 5 which is parallel to the bending part 9a. The link 10A is connected to a piston rod 8a so as to make pitching in accordance with the extension and contraction of the hydraulic cylinder 8. If the link 10A pitches, the shifting arm 5 of the parallelogram-links 7 is moved keeping parallel to the inclination of the bending part 9a.

Figure 2:
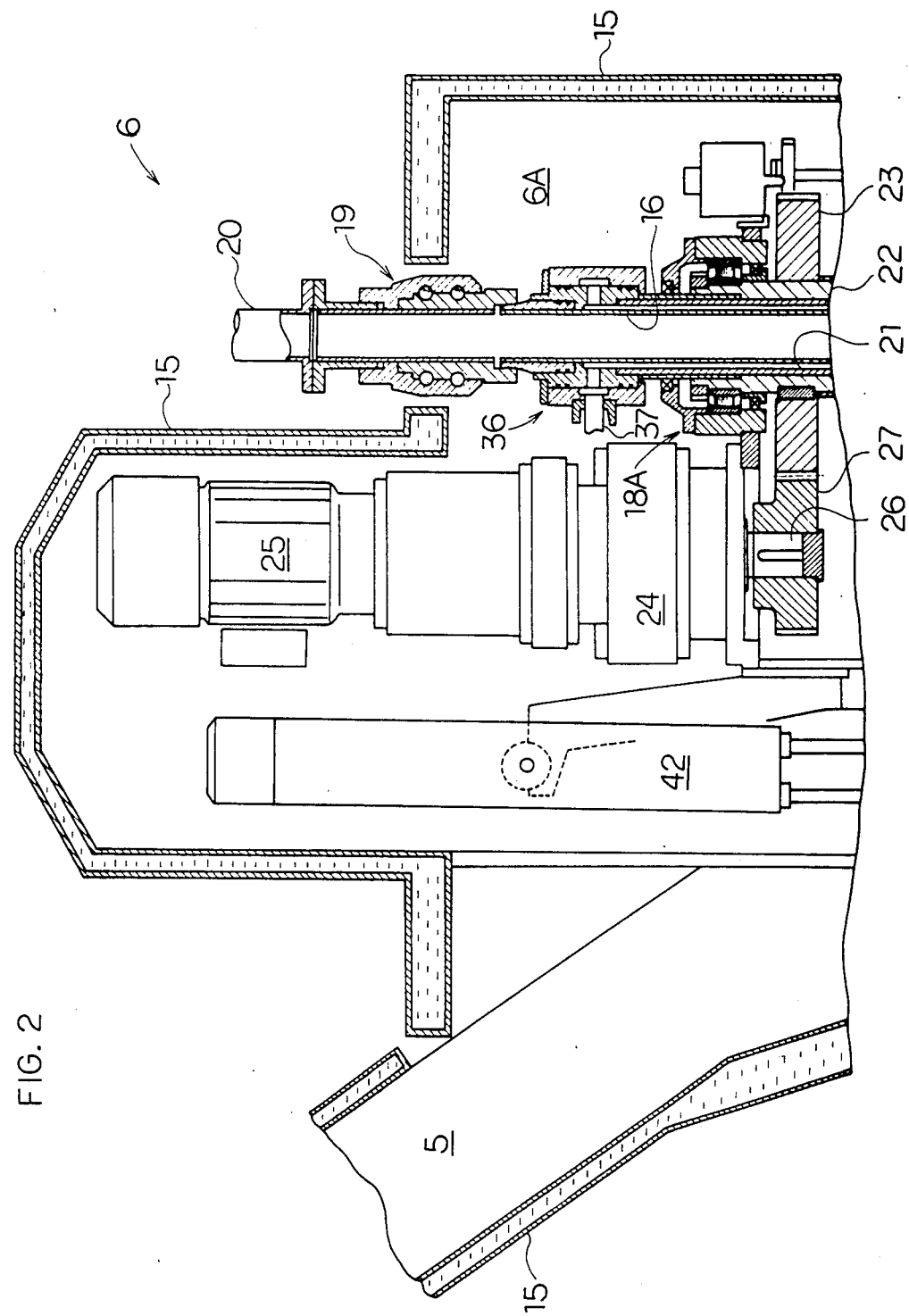
FIG. 2 is a sectional view of the upper half of a nozzle carrier.
Figure 3:
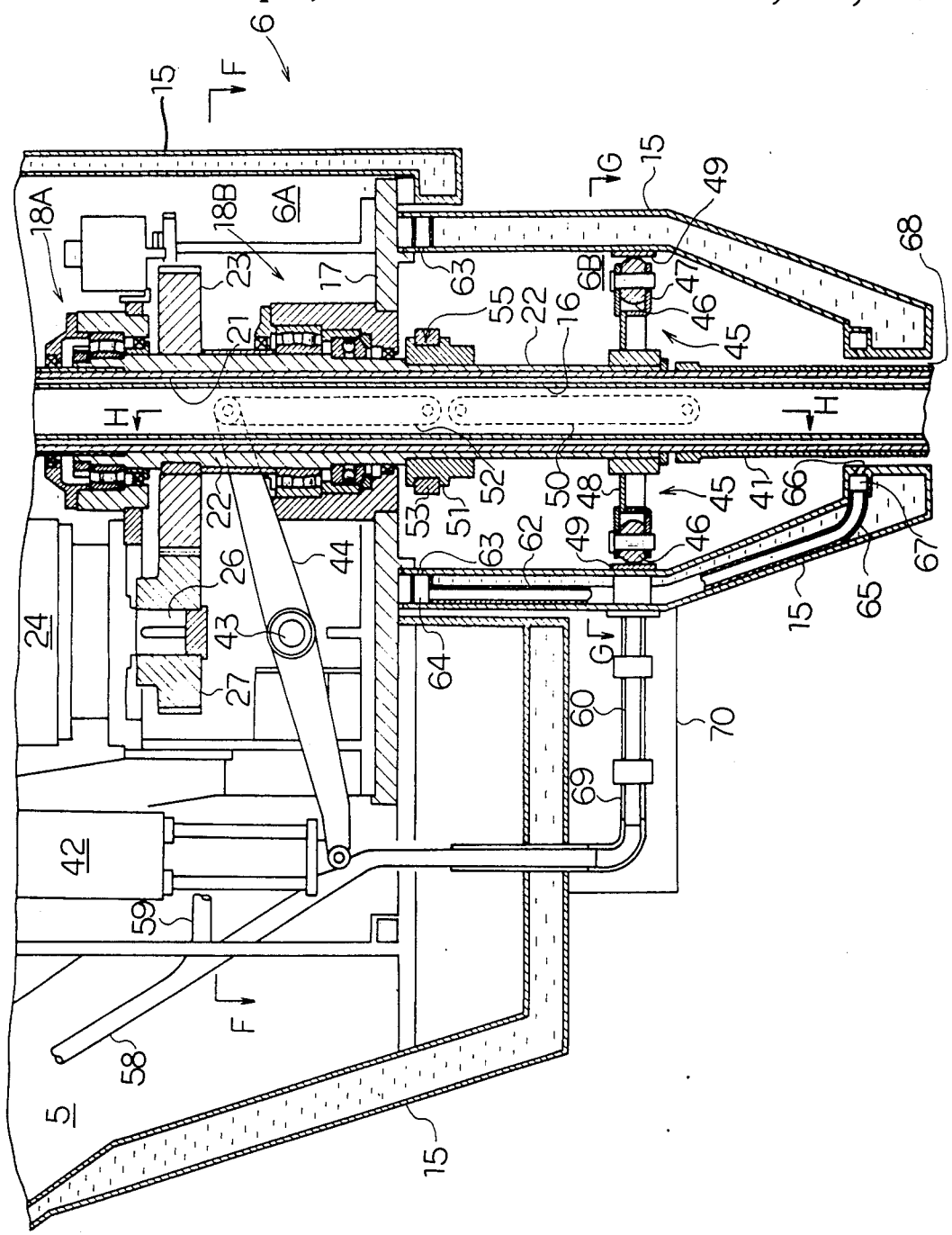
FIG. 3 is a sectional view of the lower half of a nozzle carrier.
Figure 4:
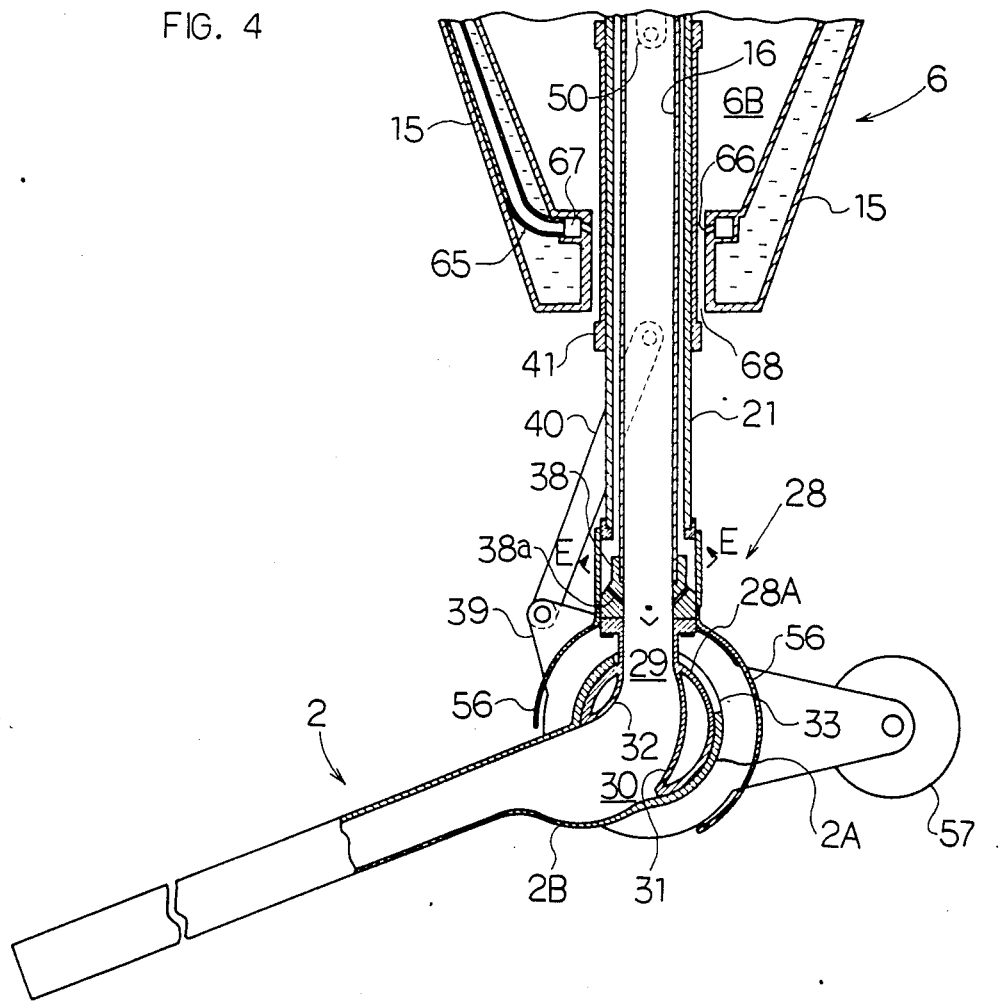
FIG. 4 is a sectional view of the lower end of the nozzle carrier and a gunning nozzle.

The nozzle carrier 6, which maintains a upright posture, is attached to the tip of the shifting arm 5. The nozzle carrier 6 is, for instance, a box structure as shown in FIG. 2 and FIG. 3 and a water jacket 15 is provided all around the circumference of the nozzle carrier 6 in order to protect from radiant heat of the furnace during the mending operation. A vertical feeding pipe 16 is provided inside the water jacket 15 to feed lining material powder. At the lower end of the vertical feeding pipe 16, the freely-swiveled gunning nozzle 2 is attached as shown in FIG. 4.

The nozzle carrier 6 is partitioned by a base plate 17, and the upper part of the nozzle carrier 6 is a driving chamber 6A and the lower part an air chamber 6B. The air chamber 6B is provided in order to prevent the heat of the furnace from influencing a driving system and a bearing system for revolving the long vertical feeding pipe 16.

The vertical feeding pipe 16 is connected with a pneumatic transport pipe 20 through a rotary joint 19 in the upper part of the driving chamber 6A and is held vertically by two bearings 18A and 18B. A water feeding pipe 21 and an outer barreled shaft 22 are fitted doubly on the vertical feeding pipe 16 and a spur gear 23 is fixed to the outer barreled shaft 22. Another spur gear 27 is fixed to a driving shaft 26 driven by a motor 25 with reducer 24. The spur gears 23 and 27 are engaged with each other so that the vertical feeding pipe 16 can be revolved.

Figure 5:
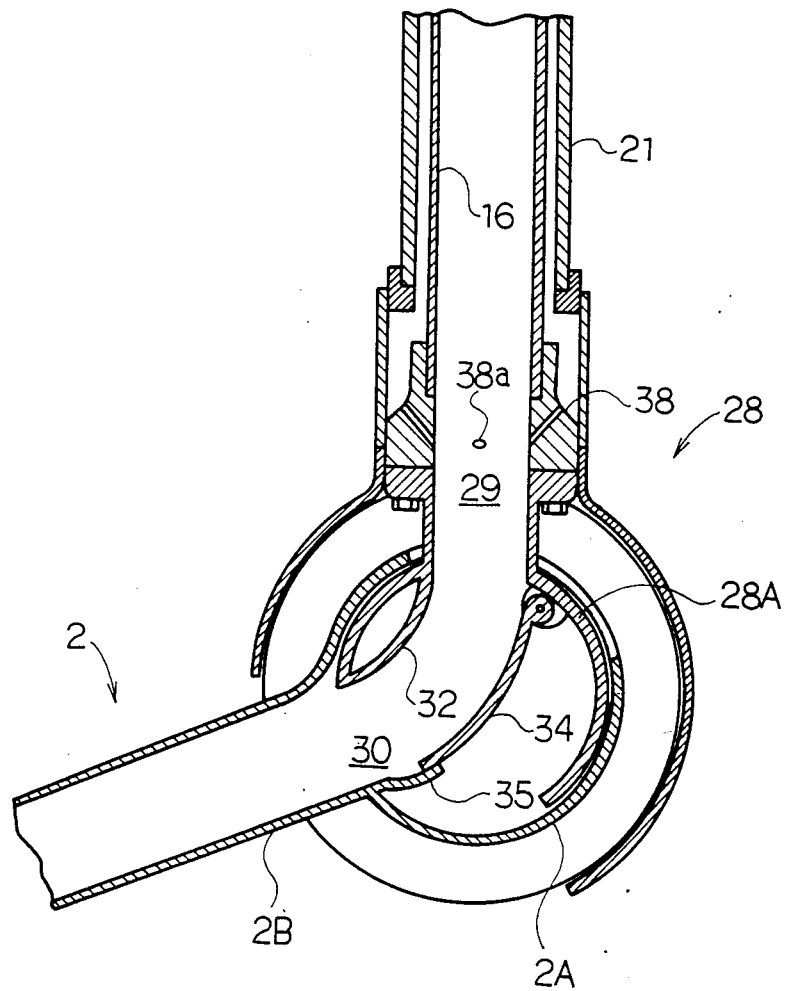
FIG. 5 is a sectional view of an articular joint with movable guide vane.

At the lower end of the vertical feeding pipe 16, an articular joint 28, which introduces the lining material into the gunning nozzle 2 smoothly, is formed. In detail, a cylindrical nozzle supporter 28A with an inlet post 29 is connected with the lower end of the vertical feeding pipe 16 as shown in FIG. 4. A cylindrical nozzle base 2A is fitted on the nozzle supporter 28A so as to facilitate swiveling of the gunning nozzle 2. The articular joint 28 mentioned above consists of the nozzle supporter 28A and the nozzle base 2A. The nozzle supporter 28A has a wide angle outlet port 30 which feeds the sludgy lining material to the gunning nozzle 2. The continuity between the gunning nozzle 2 and the vertical feeding pipe 16 is kept at any tilting angle of the gunning nozzle 2. There are arc-shaped guide vanes 31 and 32 between the outlet port 30 and the inlet port 29. The nozzle casing 2B is swollen out and opened near the nozzle base 2A as same as the outlet port 30 in order to prevent the sludgy lining material from choking near the lower end of the guide vane 31. A hole 33 is provided in the nozzle base 2A so that the gunning nozzle 2 swivels without interference with the vertical feeding pipe 16. In the example shown in FIG. 5, the guide vane 34 is hinged near the inlet port 29. The lower end of the guide vane 34 contacts with a projection 35 of the nozzle casing 2B so as to make the guide vane 34 move in accordance with swiveling of the gunning nozzle 2.

Figure 6:
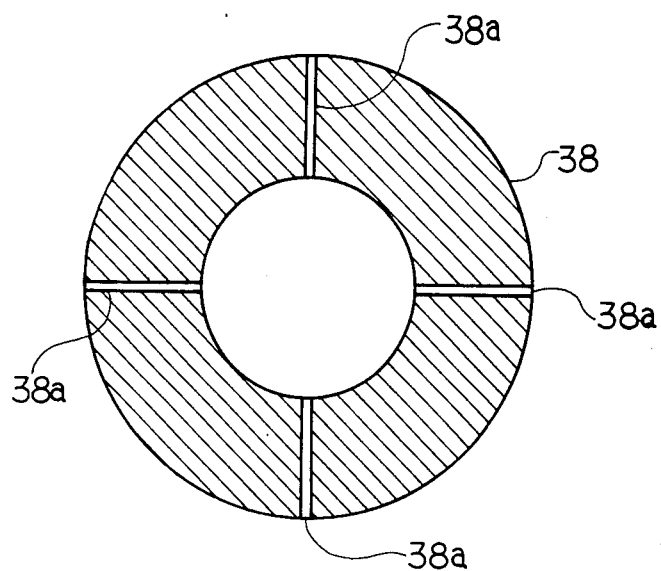
FIG. 6 is a sectional view of a mouthpiece and a development of the E—E section of FIG. 4.
Figure 7:
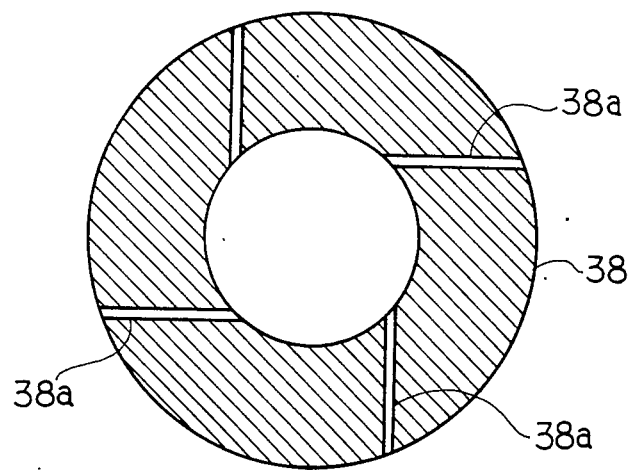
FIG. 7 is a sectional development of a mouthpiece having tangential injection holes.

The water feeding pipe 21 which feeds water to the lining material powder is installed on the outside of the vertical feeding pipe 16. The water feeding pipe 21 is connected with a rotary joint 36 (ref. FIG. 2) in the driving chamber 6A. Water from a feeding hose 37 can be fed into the water feeding pipe 21 during revolving of the vertical feeding pipe 16. The water is introduced into the vertical feeding pipe 16 through injection holes 38a of a mouthpiece 38 attached to the lower end of the vertical feeding pipe 16. The mouthpiece 38 has, for instance, four injection holes 38a as shown in FIG. 6. The direction of each injection hole 38a may be radial as shown in FIG. 6 or tangential as shown in FIG. 7. The latter example has an advantage that, as the lining material and the water whirl, the sludgy lining material becomes more homogeneous.

Figure 8:
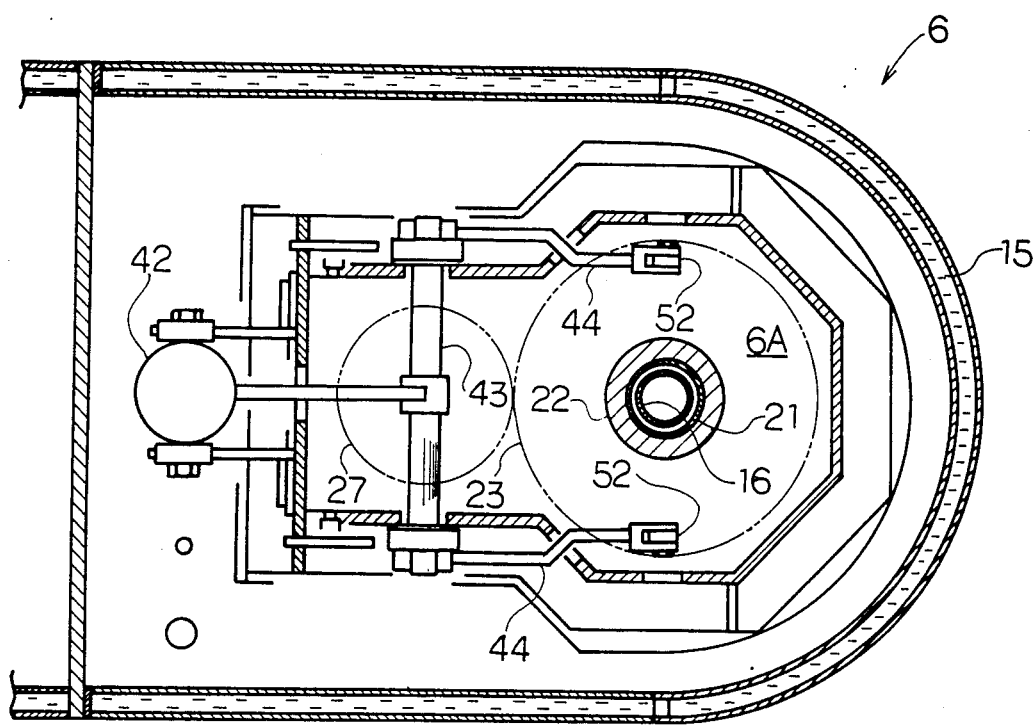
FIG. 8 is a sectional view of the F—F section of FIG. 3.
Figure 9:
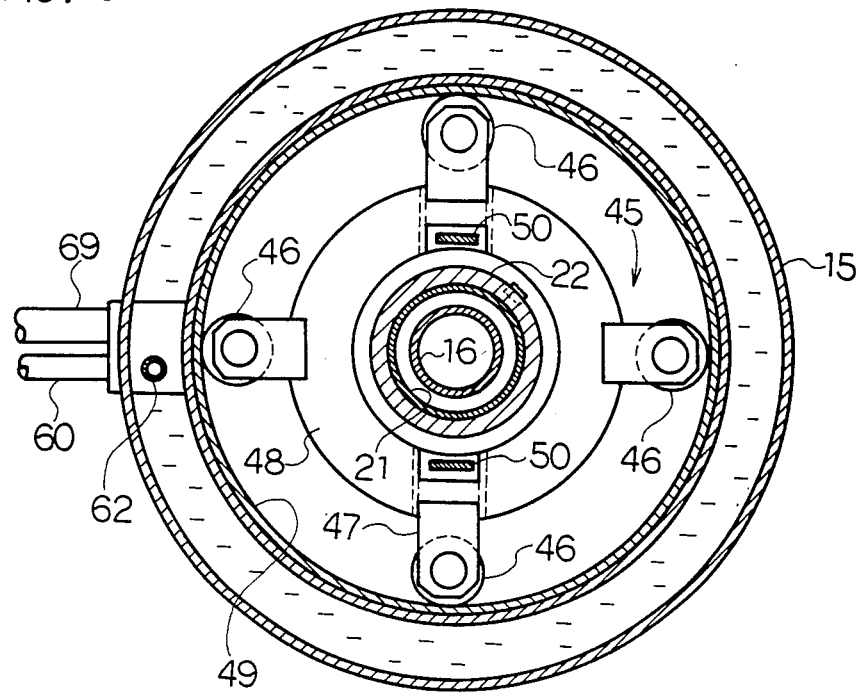
FIG. 9 is a sectional view of the G—G section of FIG. 3.

A bracket 39 shown in FIG. 4 is attached to the nozzle base 2A and a rod 40 is connected with the bracket 39. The rod 40 is connected with a cylindrical slider 41 fitted on the water feeding pipe 21. Arms 44 supported by a fulcrum 43 are pitched by a hydraulic cylinder 42 shown in FIG. 3 and are provided on both sides of the vertical feeding pipe 16 as shown in FIG. 8. The cylindrical slider 41 is moved vertically by the pitching of the arms 44. A stabilizer 45 is provided in the air chamber 6B and is attached to the vertical feeding pipe 16 in order to avoid the swing of the vertical feeding pipe 16. The stabilizer 45 consists of four rollers 46, four roller holders 47 and a disc 48. The rollers 46 roll on a liner 49 inside the air chamber 6B so that the vertical feeding pipe 16 and the water feeding pipe 21 are always kept substantially at the center of the air chamber 6B.

Figure 11:
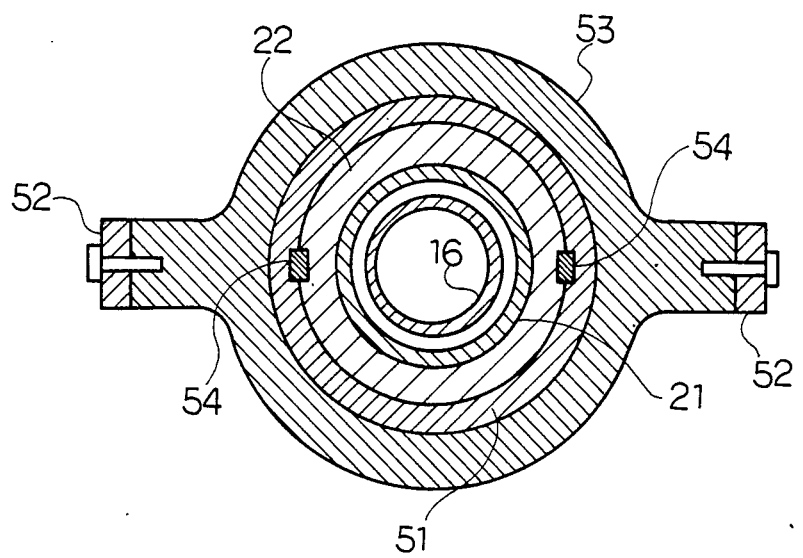
FIG. 11 is a sectional view of the K—K section of FIG. 10.
Figure 10:
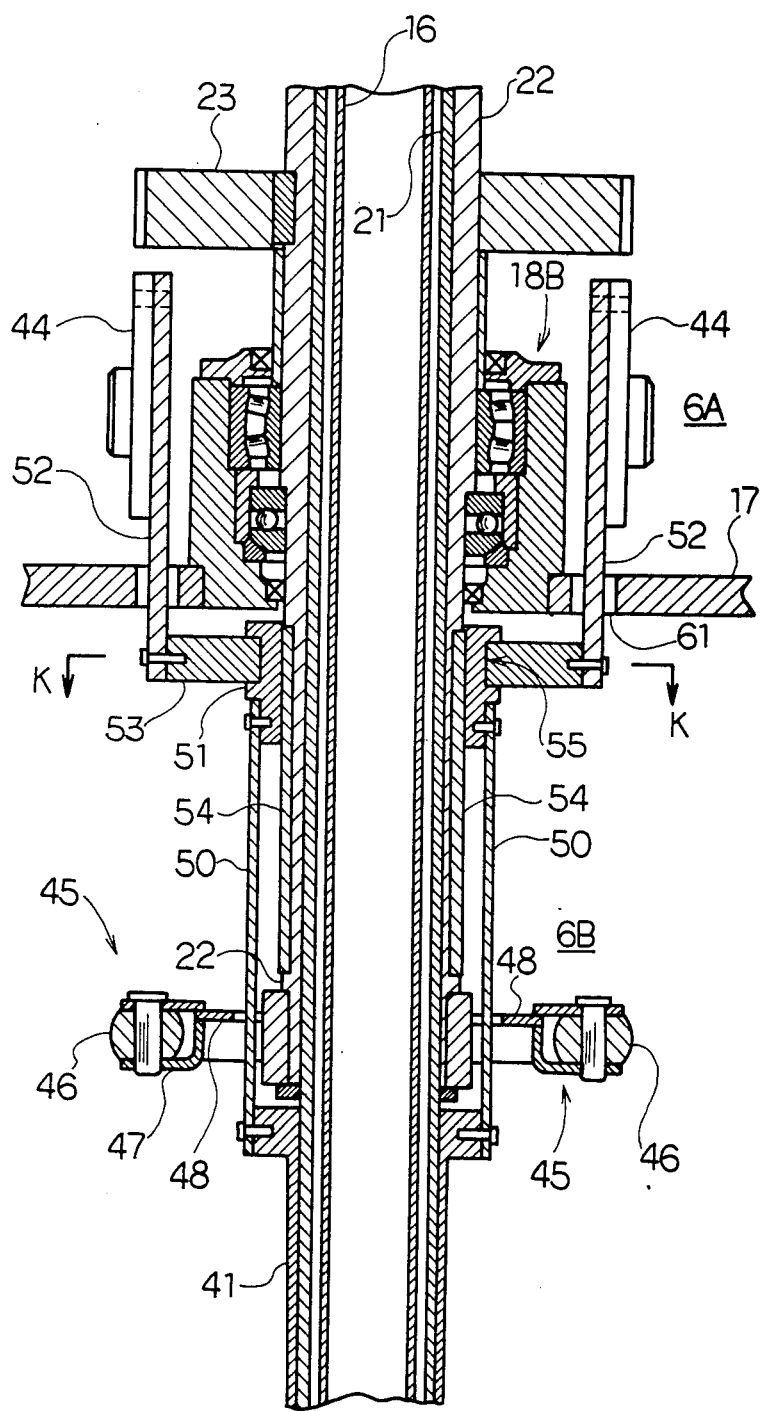
FIG. 10 is a sectional view of the H—H section of FIG. 3.

At the position where the stabilizer 45 is provided, two rods 50 are disposed in order to avoid the interference between the cylindrical slider 41 and the stabilizer 45. As shown in FIG. 10, these rods 50 are connected with a slider 51 fitted on the outer barreled shaft 22. The slider 51 is moved along a guide 54 (ref. FIG. 11) attached to the outer barreled shaft 22 in accordance with the vertical movement of an outer ring 53 connected with rods 52. The outer ring 53 is fitted in an annular groove 55 formed on the slider 51 and is free from the revolving of the vertical feeding pipe 16. When the rods 52 are moved vertically by the pitching of the arms 44, the slider 51 and the rods 50 are moved vertically. As the cylindrical slider 41 is moved, the gunning nozzle 2 is tilted around the nozzle supporter 28A.

Around the articular joint 28, a heat shield 56 always covers the nozzle supporter 28A without interfering the movement of the nozzle base 2A. With the heat shield 56, solidification of the sludgy lining material caused by the radiant heat is avoided. To facilitate smooth swiveling of the gunning nozzle 2 and to maintain the swiveling angle, a balancer 57 is attached to the nozzle supporter 28A on the side opposite to the bracket 39.

Figure 12:
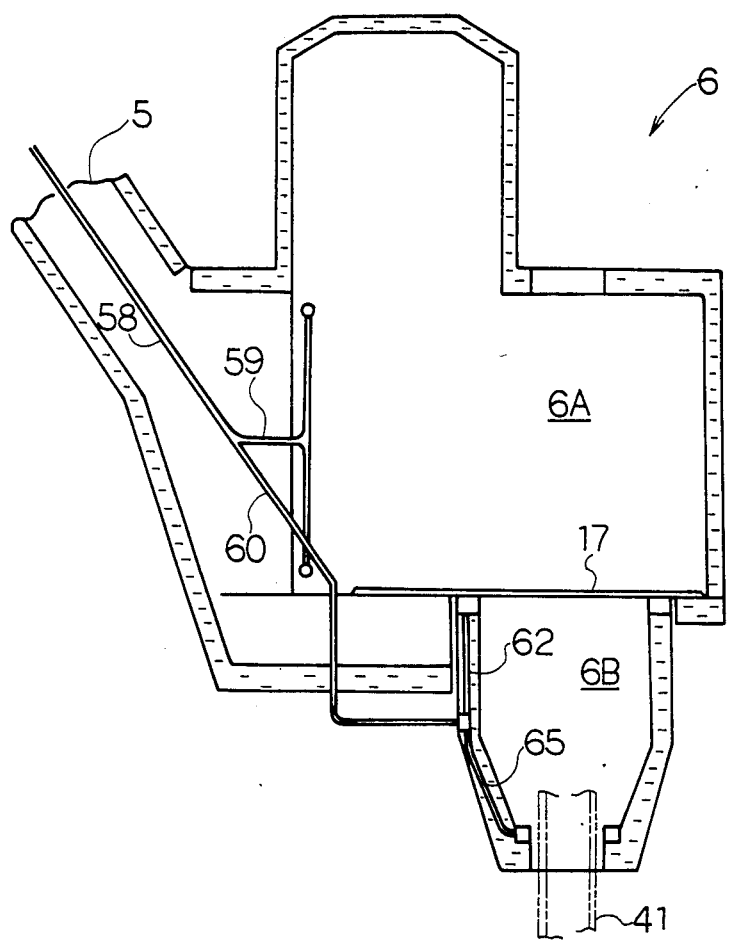
FIG. 12 is a schematic illustration of a cooling air system.

Cooling air is fed to the nozzle carrier 6 to protect the driving chamber 6A from heat. An air pipe 59 branched from the main pipe 58 in the shifting arm 5 as shown on FIG. 12. The air pipe 59 is so branched as to be able to feed the air to the upper part and the lower part of the driving chamber 6A individually. Holes 61 for the rods 52 are opened in the base plate 17 as shown in FIG. 10. As the air flows from the driving chamber 6A into the air chamber 6B through the holes 61, the air in the chamber 6A is always refreshed. The air through another air pipe 60 is directly introduced into the air chamber 6B. As shown in FIG. 3, the air pipe 60 branches off two pipes 62 and 65 in the water jacket 15. The pipe 62 is connected with an upper annular chamber 64 having air outlets 63 and the other pipe 65 is connected with a lower annular chamber 67 having a number of air outlets 66 arranged peripherally.

An opening at the lower end of the air chamber 6B is circular and a ringed gap 68 is formed between the opening wall and the cylindrical slider 41. Not only the air through air outlets 66 but also the air introduced into the air chamber 6B from the driving chamber 6A is blown downward through the gap 68. The blown air cools the surroundings of the vertical feeding pipe 16 exposed out of the nozzle carrier 6. In order to make the air flow in the air chamber 6B smooth, it is preferable the air chamber 6B is hollow. If a bearing system for the vertical feeding pipe 16 were provided in the air chamber 6B, it would obstruct the air flow. Therefore, the stabilizer 45 with good ventilation as described previously is employed. The air pipe 60 exposed out of the nozzle carrier 6 and a feeding tube 69 which feeds water to the water jacket 15 are covered with a heat shield 70.

Figure 13:
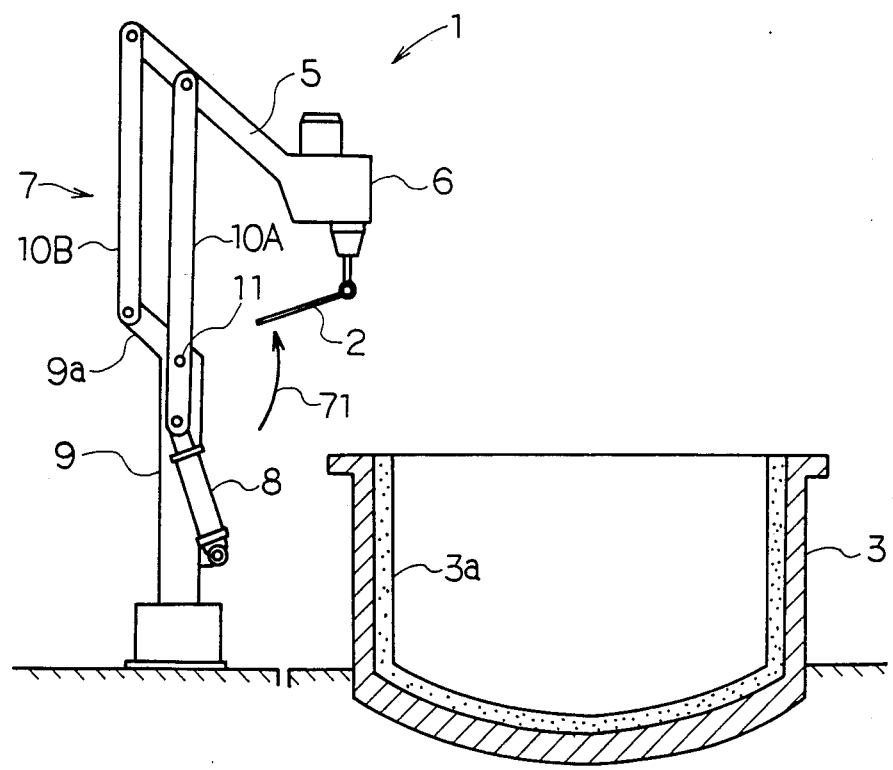
FIG. 13 is a schematic illustration of the hot gunning robot in the housing position.

When the operation of the hot gunning robot 1 is stopped to operate the electric furnace 3, the nozzle carrier 6 is retreated in an upright posture as shown in FIG. 13. At first, the hydraulic cylinder 8 is contracted and the link 10A pitches to the direction of an arrow 71. The parallelogram-links 7 is shifted to the position directly above the main pole 9 and the long shifting arm 5 is moved to the space above the side of the furnace. The main pole 9 is revolved by a driving device (not shown) and the gunning nozzle 2 is retreated from the furnace by the rotation of the shifting arm 5. The area occupied by the hot gunning robot 1 during housing is small and the space for installing any other incidental equipments can be maintained near the electric furnace 3.

While scrap or the like are charged in the electric furnace 3 and are being refined, the lining 3a is eroded. Under the condition that melting heat still remains immediately after the tapping the lining material is spouted toward the worn portion of the furnace wall. When the lining material adheres to the lining 3a, moisture is vaporized instantly and the lining material is solidified and the lining 3a is mended. When the hydraulic cylinder 8 is extended as shown in FIG. 1, the link 10A pitches down to the direction of an arrow 72 and shifting arm 5 is moved to the direction of the electric furnace 3. The posture of the shifting arm 5 is parallel to the bending part 9a and the nozzle carrier 6 travels in an upright posture along the vertical center line of the furnace 3. In this view, dimensions of the parallelogram-links 7 and the distance between the electric furnace 3 and the main pole 9 are determined. For instance, even if the distance between fulcra 11 and 13 of the link 10A is 12 feet and the nozzle carrier 6 travels vertically 3 feet, the horizontal deviation of the nozzle carrier 6 from the center line may be within 1 inch. Therefore, when the gunning nozzle 2 is revolved by the rotation of the vertical feeding pipe 16, the distance between the outlet of the nozzle and the furnace wall is substantially equal all around and the lining can be mended uniformly.

Figure 14:
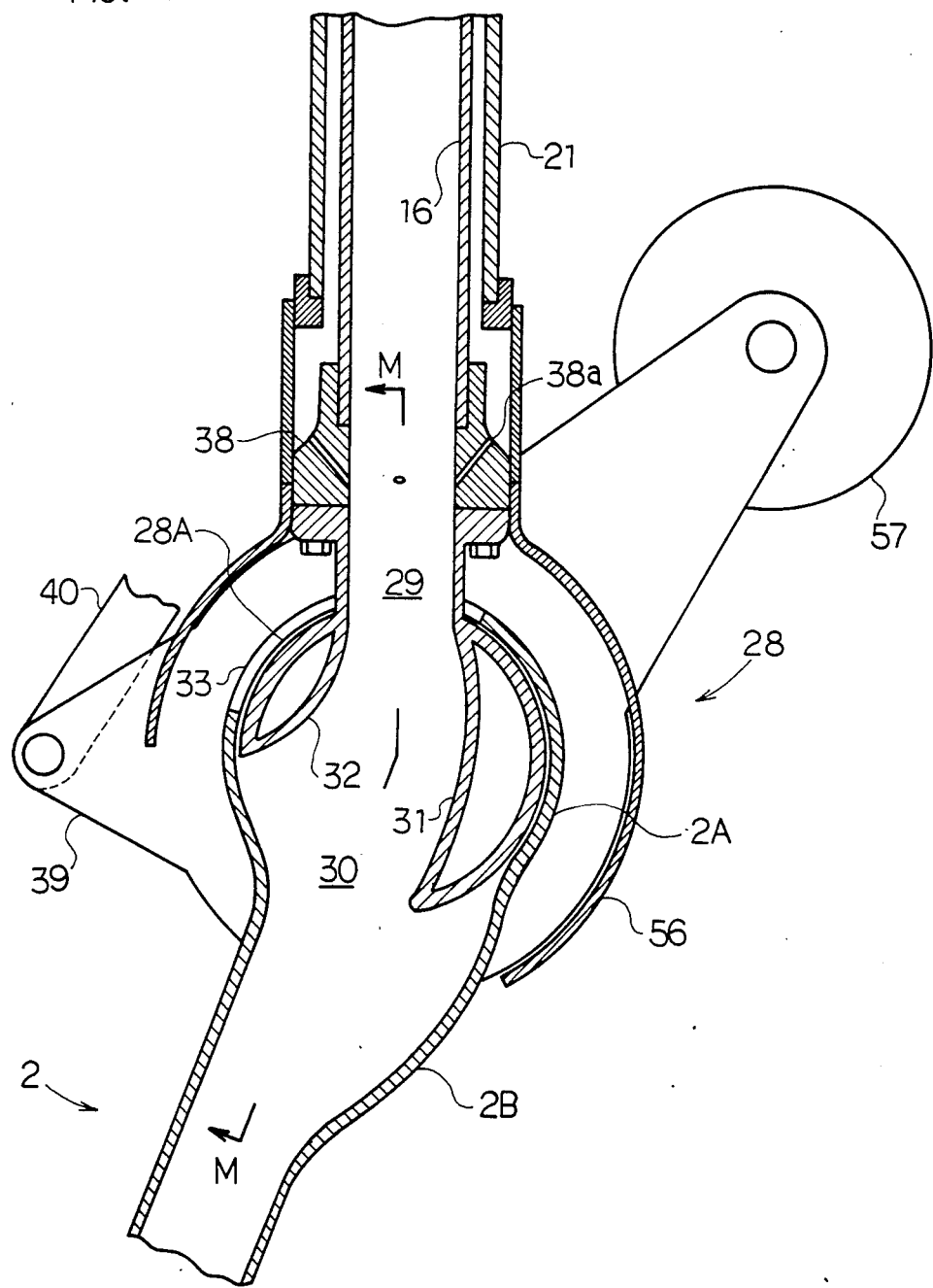
FIG. 14 is a sectional view of an articular joint when the gunning nozzle is swiveled downward.

When the nozzle carrier 6 is positioned on the vertical center line of the furnace, the lining material powder is fed through the pneumatic transport pipe 20 and the water is fed through the feeding hose 37. The lining material is introduced into the lower end of the vertical feeding pipe 16 and the water from the water feeding pipe 21 is mixed with the lining material. By the pressure, for instance 72 LB/INsq (5 kg/cm$^2$G), in the pneumatic transport pipe 20, the sludgy lining material is fed to the gunning nozzle 2 through the outlet port 30. The sludgy lining material is forcibly spouted from the outlet of nozzle toward the lining 3a. Here, the lining material in the articular joint 28 is guided by the guide vanes 31 and 32. If the hydraulic cylinder 42 is contracted and the rod 52 is moved downward, the gunning nozzle 2 is tilted downward as shown in FIG. 14. As the cylindrical slider 41 is moved along the vertical feeding pipe 16, the pitching of the arms 44 can be converted into the perfect vertical movement so that the tilting angle of the gunning nozzle 2 is changed corresponding to the extension of the hydraulic cylinder 42.

Figure 15:
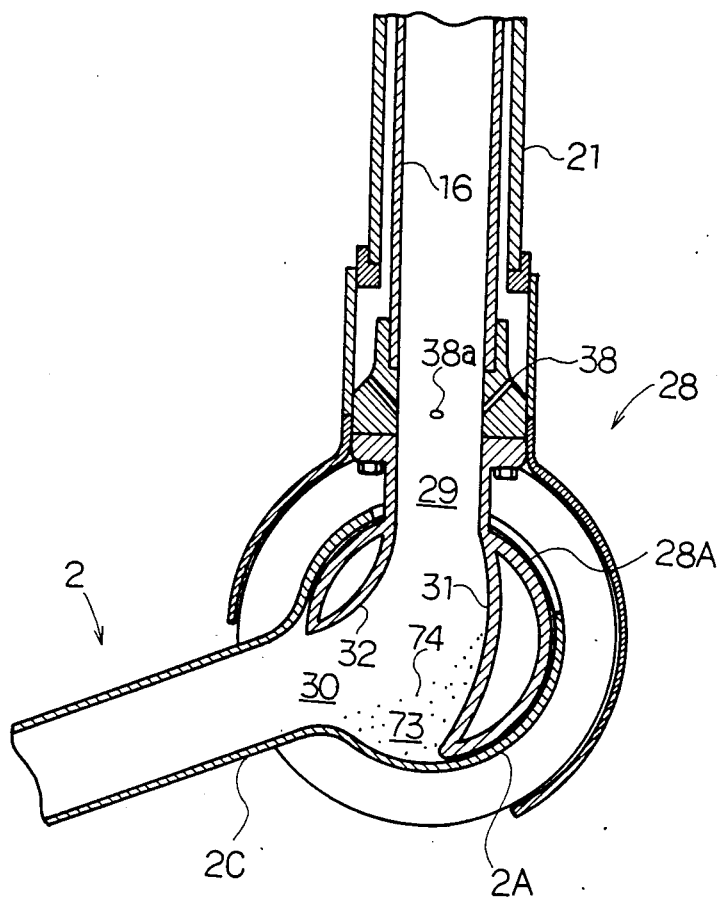
FIG. 15 is a describing of stagnating of sludgy lining material occured in the case where the base of a nozzle casing is not swollen out.
Figure 16:
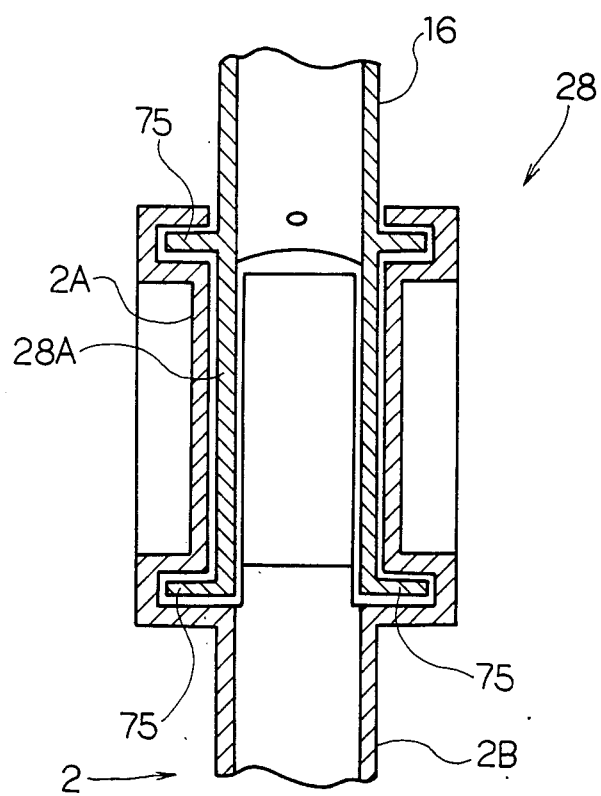
FIG. 16 is a development of the M—M section of FIG. 14.
Figure 17:
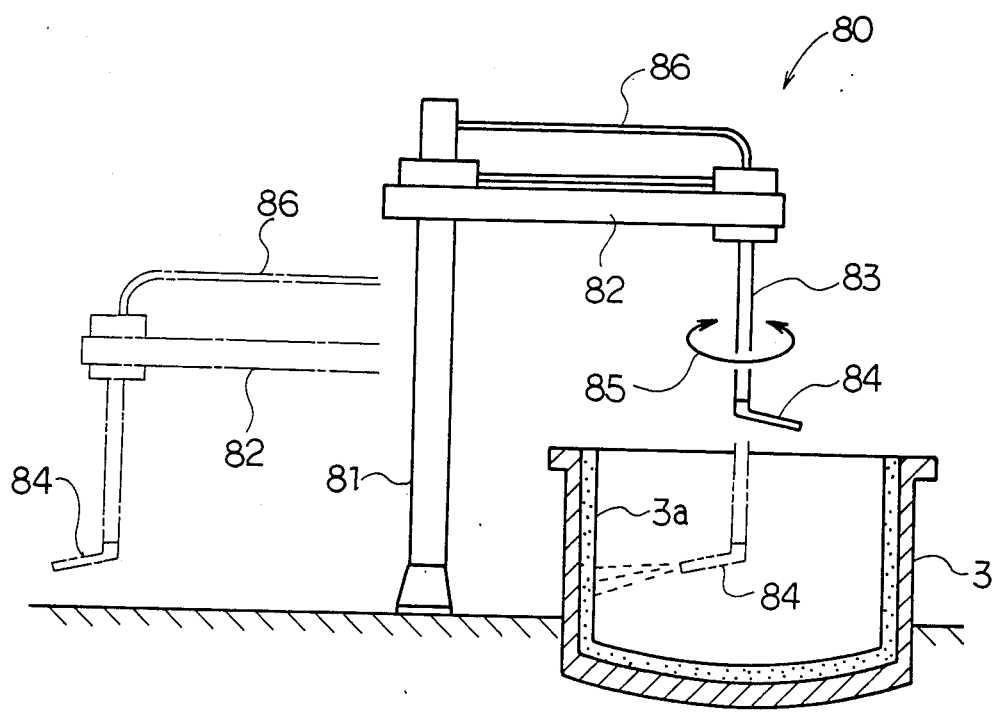
FIG. 17 is a schematic illustration of a hot gunning machine of the prior art.
Figure 18:
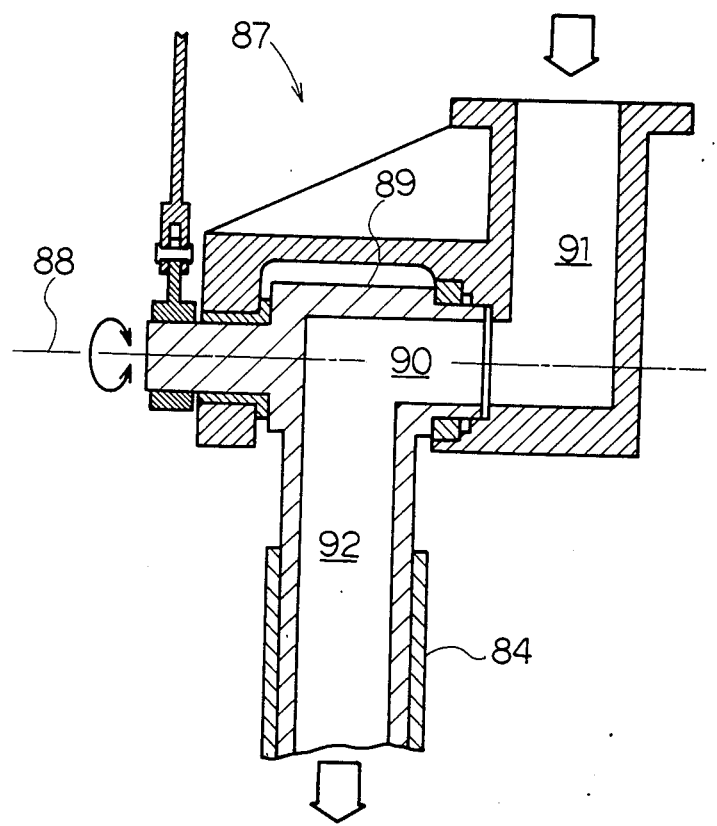
FIG. 18 is a sectional view of a swivel joint.

When the hydraulic cylinder 42 is extended and the rod 52 is moved upward, the gunning nozzle 2 takes substantially horizontal posture as shown in FIG. 4. The nozzle casing 2B is swollen out as same as the opening of outlet port 30 and the nozzle casing 2B continues the edge of the guide vane 31. Therefore, stagnation of the lining material does not occur. As shown in FIG. 15, if the base of the nozzle casing 2C were not swollen out, the lining material 74 would stagnate in a recession 73. In the example shown in FIG. 5, the movable guide vane 34 guides the lining material smoothly into the gunning nozzle 2. Disturbance of the flow and the pressure rise of the lining material in the articular joint 28 are suppressed. The lining material does not leak out from the hole 33. As shown in FIG. 16, flanges 75 are so equipped on the vertical feeding pipe 16 and the nozzle base 2A is fitted to the flanges 75, a labyrinth forms. The sealing effect of the labyrinth also prevents the lining material from leaking out.

In order to revolve the gunning nozzle 2, the vertical feeding pipe 16 is revolved by the motor 25. The lining material from the pneumatic transport pipe 20 and the water from the feeding hose 37 are continuously fed through the rotary joints 19 and 36 respectively. The gunning nozzle 2 is revolved with the articular joint 28 by the revolving of the vertical feeding pipe 16.

When the gunning nozzle 2 travels downward the hydraulic cylinder 8 is further extended. As previously described, the horizontal deviation due to the vertical movement of the nozzle carrier 6 is small enough to be neglected compared with the diameter of the furnace. If the arms 44 are pitched by the hydraulic cylinder 42 and the slider 51 is moved vertically along the guide 54 the gunning nozzle 2 is swiveled around the nozzle supporter 28A. In order to mend the bottom of the furnace, the gunning nozzle 2 is tilted downward as shown by broken lines in FIG. 1. By instructing the portion to be mended to a control box (not shown), the portion can be mended under the hot condition continuously, automatically and quickly.

If a feeding hose 76 which feeds the lining material is installed along the parallelogram-links 7, the deflection or deformation of the feeding hose 76 decreases so that the fluctuation of the quantity of the spouted lining material is reduced.

When the cooling air is fed through the main pipe 58, the air is spouted to the upper part and the lower part of the driving chamber 6A from the air pipe 59 and flows into the air chamber 6B through the holes 61 so that the driving chamber 6A is always cooled by fresh air. The air from the air pipe 60 is spouted from the air outlets 63 and 66 of two annular chambers 64 and 67 respectively. The air is blown out of the nozzle carrier 6 through the ringed gap 68 and the air chamber 6B is also filled with fresh air. A driving system and a bearing system for the vertical feeding pipe 16 are protected from the heat of the furnace. The swing of the long vertical feeding pipe 16 in the air chamber 6B is prevented by the stabilizer 45 and the revolving of the vertical feeding pipe 16 is allowed by the roller 46.

After the lining is mended, the nozzle carrier 6 is retreated to the side of the furnace as shown in FIG. 13 and shifting arm 5 is rotated around the main pole 9 and the gunning nozzle 2 is away from the furnace. In order to remove the lining material adhering to the inside of the vertical feeding pipe 16, compressed air is fed into the vertical feeding pipe 16 for several minutes and the lining material powder is discharged from the outlet of the gunning nozzle 2. After the air purge, cleaning water is fed into the water feeding pipe 21 and the cleaning water is injected into the gunning nozzle 2 through the injection holes 38a several minutes. The sludgy lining material remaining in the articular joint 28 and the gunning nozzle 2 are washed out. Therefore, manpower and time for maintenance, inspection and cleaning are reduced.

What is claimed is:

1. A hot gunning robot for applying a lining material to interior surfaces of a furnace to obtain a furnace lining, comprising:

support base means;

a shifting arm operatively connected to the support base means and a nozzle carrier attached to the shifting arm;

parallelogram-link means connecting the support base means to the shifting arm for moving said shifting arm in a constant orientation between a first position wherein said nozzle carrier and shifting arm are located substantially entirely outside said furnace and a second position wherein said nozzle carrier is inside the furnace, said parallelogram-link means being substantially entirely located outside the furnace in either the first or second position of the nozzle carrier;

a substantially vertical feed pipe rotatably mounted in said nozzle carrier;

a gunning nozzle and means for connecting the nozzle to the pipe for supplying lining material to the nozzle through the pipe, said connecting means including a cylindrical nozzle supporter with an inlet port communicating with the lower end of said feed pipe;

said gunning nozzle having nozzle base means fitted on said cylindrical nozzle supporter for allowing the gunning nozzle to tilt in relation to the vertical feed pipe and thereby supply lining material to substantially entirely all interior surfaces of the furnace, wherein said cylindrical nozzle supporter has a wide angle outlet port defined by side wall means divergently flared in the downstream direction of feed and a guide vane connected to the nozzle supporter and located within the nozzle supporter between said outlet port and said inlet port.

2. A hot gunning robot for furnace lining as set forth in claim 2, wherein said gunning nozzle includes a nozzle casing attached thereto and mounted to the nozzle supporter so that the casing acts as an extension of the nozzle supporter to provide support for the gunning nozzle, wherein said nozzle casing has an upstream diameter approximately egual to the outlet port diameter, said nozzle casing having a lower side wall portion curved towards the gunning nozzle to define a downstream diameter of the nozzle casing that is less than the upstream diameter and approximately, equal to the gunning nozzle diameter.

3. A hot gunning robot for furnace lining as set forth in claim 1, wherein said guide vane is hinged to the nozzle supporter near said inlet port for movement during tilting of said gunning nozzle.

4. A hot gunning robot for applying a liningy material to interior surfaces of a furnace to obtain a furnace lining, comprising:

support base means;

a shifting arm operatively connected to the support base means and a nozzle carrier attached to the shifting arm;

parallelogram-link means connecting the support base means to the shifting arm for moving said shifting arm in a constant orientation between a first position wherein said nozzle carrier and shifting arm are located substantially entirely outside said furnace and a second position wherein said nozzle carrier is inside the furnace, said parallelogram-link means being substantially entirely located outside the furnace in either the first or second position of the nozzle carrier;

a substantially vertical feed pipe rotatably mounted in said nozzle carrier;

a gunning nozzle and means for connecting the nozzle to the pipe for supplying lining material to the nozzle through the pipe, said connecting means including a cylindrical nozzle supporter with an inlet port communicating with the lower end of said feed pipe;

said gunning nozzle having nozzle base means fitted on said cylindrical nozzle supporter for allowing the gunning nozzle to tilt in relation to the vertical feed pipe and thereby supply lining material to substantially entirely all interior surfaces of the furnace, including:

a water feeding pipe which is installed on the outside of said vertical feed pipe in order to feed water to lining material powder;

a rotary, joint for mounting said water feeding pipe to said vertical feed pipe; and a mouthpiece disposed between lower ends of said pipes and injection holes formed in said mouthpiece through which water is fed into said gunning nozzle upstream from the cylindrical nozzle supporter through the vertical feed pipe.

5. A hot gunning robot for furnace lining as set forth in claim 4, including:

pitching arms provided in said nozzle carrier;

a cylindrical slider which is fitted on said vertical feed pipe and moved vertically by said arms; and a bracket provided on said nozzle base, said cylindrical slider and said bracket connected together by a rod.

6. A hot gunning robot for furnace lining as set forth in claim 4, wherein said nozzle carrier comprises a driving chamber and an air chamber;

said driving chamber including a driving system and a bearing system means for rotating said vertical feed pipe about its axis;

said air chamber including a stabilizer means attached to said vertical feed pipe to prevent said pipe from swinging within the nozzle carrier by providing centering support therefor.

7. The hot gunning robot of claim 6, wherein said stabilizer means includes a disk through which said feed pipe and water feeding pipe extend and a series of rollers mounted circumferentially to said disk for contact with a liner wall positioned within said air chamber, rotation of said disk within said chamber providing centering support for said feed pipe.

8. The hot gunning robot of claim 4, wherein said support base means includes a shifter mounted to a generally vertical post of the support base means, said post having an upwardly inclined end portion extending generally parallel to the shifting arm, said shifter extending from the post for connection to the link means.

9. The hot gunning robot of claim 8, wherein said parallelogram links include a pair of links, an upper link of said links having one end pivotally secured to a tip of the upper end portion and a lower link being pivotally secured to a lower end of the upper end portion at an intermediate part of said lower link, said shifter including a cylinder fixed to the lower end of the lower link, corresponding opposite ends of the upper and lower links being pivotally secured to the shifting arm at an upper end thereof and intermediate portion thereof, respectively.

* * * * *